US005110665A

United States Patent [19]

Titterington

[11] Patent Number: 5,110,665

[45] Date of Patent: May 5, 1992

[54] LIGHT-TRANSMISSIVE SUBSTRATES COATED TO PROMOTE ADHESION OF PHASE-CHANGE INKS

[75] Inventor: Donald R. Titterington, Tualatin, Oreg.

[73] Assignee: Tektronix, Inc., Beaverton, Oreg.

[21] Appl. No.: 642,732

[22] Filed: Jan. 17, 1991

Related U.S. Application Data

[62] Division of Ser. No. 457,645, Dec. 27, 1989, Pat. No. 4,992,304.

[51] Int. Cl.[5] ........................ B32B 7/12; B32B 33/00; B32B 35/00

[52] U.S. Cl. ................................ 428/195; 346/135.1; 428/207; 428/412; 428/474.4; 428/475.2; 428/476.9; 428/480; 428/532; 428/913

[58] Field of Search ..................... 346/135.1; 428/195, 428/207, 412, 474.4, 475.2, 476.9, 480, 532, 913

[56] References Cited

U.S. PATENT DOCUMENTS

| | | | |
|---|---|---|---|
| 4,801,473 | 1/1989 | Creagh et al. | 427/164 |
| 4,873,134 | 10/1989 | Fulton et al. | 428/156 |
| 4,889,761 | 12/1989 | Titterington et al. | 428/195 |
| 4,992,304 | 2/1991 | Titterington | 427/164 |

*Primary Examiner*—James C. Cannon
*Attorney, Agent, or Firm*—John D. Winkelman; Jerome S. Marger

[57] ABSTRACT

A method for producing a light-transmissive printed substrate is provided. The substrate is printed with a predetermined pattern of a light-transmissive phase change ink which initially transmits light in a non-rectilinear path. When the pattern of solidified phase change ink is subsequently reoriented to form an ink layer of substantially uniform thickness, a printed image layer is formed which will transmit light in a substantially rectilinear path and is suitable for overhead projection.

In some instances the adhesion between the ink image layer and the substrate is not as high as is desired. This problem can result in delamination of the ink from the film under certain conditions. In order to overcome this problem, an intermediate optically clear adhesion promoting layer is introduced between the light-transmissive phase change ink and the base substrate. Thus, a substrate has been developed which maintains the high level of light transmissivity in the ink and substrate, while preventing adhesion failure in the area between the printed image and the base substrate.

8 Claims, 1 Drawing Sheet

LIGHT-TRANSMISSIVE SUBSTRATES COATED TO PROMOTE ADHESION OF PHASE-CHANGE INKS

This is a division of application Ser. No. 457,645, filed Dec. 27, 1989, now U.S. Pat. No. 4,992,304.

BACKGROUND OF THE INVENTION

The present invention relates to light-transmissive substrates printed with phase-change ink jet inks, and to methods for producing such printed substrates.

In general, phase change inks are in solid phase at ambient temperature, but are liquid at the elevated operating temperature of an ink jet printing device. Drops at the operating temperature are ejected from the printing device and, when the ink contacts the surface of printing media, the drops quickly solidify to form a predetermined pattern.

Phase change ink is desirable since it remains in a solid phase at room temperature during shipping, long-term storage, etc. Also, the problems associated with nozzle clogging due to ink evaporation are largely eliminated, thereby improving the reliability of ink jet printing. Since the ink droplets rapidly solidify upon contact with the substrate, migration of ink along the printing medium is greatly reduced and image quality is improved. Rapid solidification allows high quality images to be printed on a wide variety of printing media. Furthermore, phase change ink jet printing is unique in that the raw base film (PET) can be used without any special coatings to make an acceptable overhead transparency.

The initial prior art on phase change inks for ink jet printing involved monochrome inks jetted by electrostatic printing devices. Thus, for example in U.S. Pat. No. 3,653,932, a low melting ink (30° C. to 50° C.) is provided employing an ink base comprising di-esters of sebacic acid. In a similar process, U.S. Pat. No. 3,715,219 describes another low melting point ink (30° C. to 60° C.) comprising a paraffin alcohol-based ink. However, when low melting point phase change inks are employed in printing onto a substrate, they exhibit offset problems, namely, when the substrates printed with these inks are stacked and stored for subsequent use, they can become adhered to one another, particularly if high ambient temperatures are experienced.

U.S. Pat. No. 4,390,369 and U.S. Pat. No. 4,484,948 describe methods for producing monochrome phase change inks which employ a natural wax ink base, such as Japan wax, candelilla wax, carnauba wax, etc., which is printed from a drop-on-demand ink jet device at a temperature ranging between 65° C. and 75° C. In U.S. Pat. No. 4,659,383, a monochrome ink composition is provided having an ink base comprising a C20-24 acid or alcohol, a ketone, and an acrylic resin plasticizer. These monochrome ink compositions are not durable and when printed can be smudged with routine handling and folding.

In Japanese patent application 128,05,78, aliphatic and aromatic amides which are solid at room temperature, such as acetamide, are employed as printing inks. U.S. Pat. No. 4,684,956 is directed to monochrome phase change inks utilizing synthetic microcrystalline wax (hydrocarbon wax) and microcrystalline polyethylene wax. This molten composition can be applied to a variety of porous and non-porous substrates using drop-on-demand ink jet application techniques.

EP 0187352 and Ep 0206286 reference phase change ink jet printing in color. The ink bases for these systems comprise fatty acids, a thermoplastic polyethylene and a phase change material in the first application; and the alcohol portion of a thermal setting resin pair, a mixture of organic solvents (o-and p-toluene sulfonamide) and a dye in the second application.

U.S. Pat. No. 4,830,671 provides a hot melt ink composition comprising a resinous binder and a colorant. The resinous binder comprises the formula

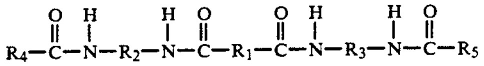

wherein $R_1$ represents a polymerized fatty acid residue with two carboxylic acid groups, $R_2$ and $R_3$ are the same or different and each represent an alkylene with up to 12 carbon atoms, a cycloalkylene with 6 to 12 carbon atoms, an arylene with 6 to 12 carbon atoms or an alkarylene with 7 to 12 carbon atoms and $R_4$ and $R_5$ are the same or different and each represents an alkyl having up to 36 carbon atoms, a cycloalkyl having up to 36 carbon atoms and aryl having up to 36 carbon atoms or an alkaryl having up to 36 carbon atoms, wherein said resinous binder has a melt viscosity of 250 CPS or less at 150 degrees C. and (b) a colorant distributed through the resinous binder in an amount sufficient to impart a predetermined color to the resulting hot melt ink composition.

Related application Ser. No. 227,846, filed Aug. 3, 1988, now U.S. Pat. No. 4,889,560 assigned to the common assignee of this application, which is incorporated herein by reference, is directed to a phase change ink composition which is rectilinearly light transmissive. The ink composition comprises a fatty amide-containing compound which can be a tetraamide and/or a monoamide compound.

There are several references in the prior art to manipulation of images formed from phase change inks. These manipulations can take place either during or after the printing process. In U.S. Pat. No. 4,745,420, droplets of a phase change ink are ejected onto a target and spread thereon by the application of pressure to increase ink coverage and minimize the volume of ink that is required to be applied to the surface of the target. In other words, dots of phase change ink which do not initially cover the entire target are spread by pressure application over the entire target surface.

This is similar to xerographic image fusing, where the area of contact between the toner and the substrate is substantially increased by causing the toner to spread and penetrate somewhat into the underlying substrate. see "The Physics and Technology of Xerographic Processes", by Williams, published in 1984 by J. Wiley & Sons. The mechanical properties of the toner are such that plastic deformation and flow readily occur. In the case of the phase change ink in U.S. Pat. No. 4,745,420 or the xerographic toner, there is spreading of the ink or toner across the paper to form opaque characters or patterns thereon.

Although the previous references describe fusing of images between a pair of mechanically loaded rollers at ambient temperatures, hot roll fusing has also been used in toner applications. This is a method in which two rolls (one heated) are mechanically loaded together and turned to provide a transient application of heat and pressure to the substrate. The toner is typically heated to above it's glass transition temperature ($T_g$), which enables it to coalesce, flow, and penetrate the substrate. The rolling pressure and capillary action facilitate coverage.(see "Trends and Advances In Dry Toner Fusing", by Dr. John W. Trainer, Institute For Graphic Communication, June 1985).

Another system for applying phase change inks, U.S. Pat. No. 4,751,528, relates to an ink jet apparatus for the controlled solidification of such inks to assist in controlled penetration of the substrate. The apparatus includes a substrate-supporting, thermally conductive platen and heater and a thermoelectric cooling arrangement, both disposed in heat communication with the platen.

Ink jet printing of colored inks on to light transmissive media for displaying color images by overhead projection has historically been a problem. For example, in the case of aqueous inks, special coatings must be provided on the light transmissive medium in order to absorb the solvent so that images of high quality are formed. See U.S. Pat. No. 4,503,111, U.S. Pat. No. 4,547,405 and U.S. Pat. No. 4,555,437. Even though special coatings are not necessarily required on receptor films used for phase change ink jet printing, when prior art color phase change inks are printed on transparent substrates the image cannot be used in an overhead projection system. There are two reasons for this. Firstly, the inks are not inherently transparent and do not transmit the majority of the light that impinges on them. The second reason is illustrated in FIG. 1. Drops of phase change ink 12 tend to solidify on the substrate 14 as hemispheres which refract light 16 away from the collection lens 18 of the projection system, in a non-rectilinear path, even if the ink itself is optically transparent. Thus the projected image is visible only in contrast, and most of the colors of the image are not apparent. Therefore to date, phase change inks have not been effectively employed for displaying color images by overhead projection techniques.

In recently published European Patent Application 88308219.0, a transparency with jetted color hot melt ink is made by a process including the steps of ejecting drops of the heated ink onto a transparent resinous support, cooling the drops so that they become solid, and flattening the drops to produce a planar surface which minimizes refraction and scattering of light projected thereon or therethrough.

Coating of transparent and opaque plastic films to promote adhesion of certain types of printing inks to an underlying substrate is well known. For instance, in thermal transfer printing applications, paper and transparencies are coated with certain materials to enhance the adhesion of wax to the transparencies during the wax transfer process. An example of this known technology is the subject of U.S. Pat. No. 4,847,237.

SUMMARY OF THE INVENTION

In another related application, Ser. No. 236,490 filed Aug. 25, 1988, now U.S. Pat. No. 4,889,761 assigned to the common assignee of this application, which is incorporated herein by reference, a method for producing a light-transmissive printed substrate is provided. The substrate is printed with a predetermined pattern of a light-transmissive phase change ink which initially transmits light in a nonrectilinear path. When the pattern of solidified phase change ink is subsequently reoriented to form an ink layer of substantially uniform thickness, a printed image layer is formed which will transmit light in a substantially rectilinear path and is suitable for overhead projection (see FIG. 2).

It has now been discovered that a problem heretofore not recognized by the prior art can occur when the above-described light-transmissive phase change ink printed substrate is formed. More specifically, in some instances the adhesion between the ink image layer and the substrate is not as high as is desired. This problem can result in delamination of the ink from the film under certain conditions. Therefore, applicants have determined that it is desirable to enhance the adhesion of these inks to the film substrate in order to achieve good adhesive properties.

In order to overcome this problem, an intermediate adhesion promoting layer is introduced between the light-transmissive phase change ink and the base substrate. Thus, a substrate has been developed which maintains the high level of light transmissivity in the ink and substrate, while preventing adhesion failure in the area between the printed image and the base substrate.

The foregoing and other objects, features and advantages of the invention will become more readily apparent from the following detailed description of a preferred embodiment which proceeds with reference to the drawings.

DETAILED DESCRIPTION OF THE INVENTION

Figure 1:
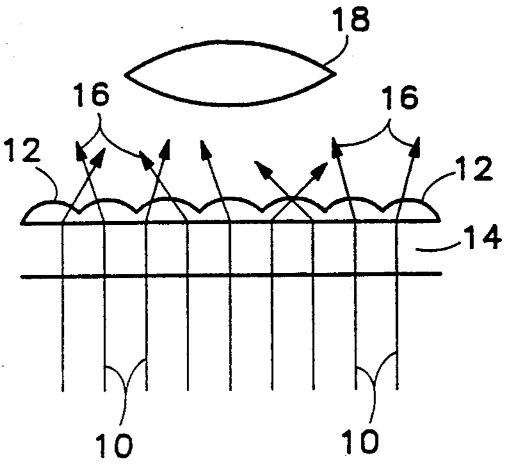
FIG. 1 is a schematic representation of the transmission of beams of light from a light projection source, through a substrate, which transmits light in a substantially non-rectilinear path.
Figure 2:
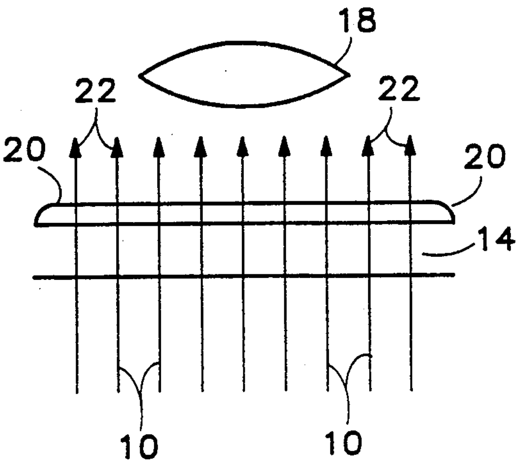
FIG. 2 is a schematic representation of the transmission of beams of light from a light projection, source through a substrate, which transmits light in a substantially rectilinear path.

This invention is directed to a printed substrate comprising a light-transmissive phase-change ink image layer which is printed onto a base substrate, preferably a substantially transparent impermeable substrate. An intermediate layer is disposed between the ink image layer and substrate for promoting adhesion therebetween. In spite of the introduction of such an intermediate adhesion promotion layer, the printed substrate of this invention will nevertheless transmit light in a substantially rectilinear path. This is because an adhesion promotion layer is selected to be optically clear and is applied to the substrate in a thin, uniform layer.

The phase change ink composition employed in forming the ink image layer comprises the combination of a phase change ink carrier composition and a compatible colorant. The subject phase change ink carrier composition typically comprises a fatty amidecontaining material. The fatty amide-containing material of the phase change ink carrier composition of the present invention preferably comprises a tetraamide compound. The preferred tetra-amide compounds for producing the phase change ink carrier composition are Dimer acid-based tetra-amides which preferably include the reaction product of a fatty acid, a diamine (ethylene diamine) and a Dimer acid. Fatty acids having from 10 to 22 carbon atoms are preferably employed in the formation of the Dimer acid-based tetra-amide. These Dimer acid-based tetra-amides are produced by Union Camp and comprise the reaction product of ethylene diamine, Dimer acid, and the following fatty acids: decanoic acid (Union Camp X3202-23), myristic acid (Union Camp X3202-56), stearic acid (Union Camp X3138-43, X3164-23, X3202-44, X3202-46, X3222-65, X3261-37, X3261-53, and X3290-72), docasanic acid (Union Camp X3202-36). For purposes of this invention, the most preferred Dimer acid-based tetraamide is the reaction product of Dimer acid, ethylene diamine and stearic acid in a stoichiometric ratio of 1:2:2. Stearic acid is the preferred fatty acid reactant because its adduct with Dimer acid and ethylene diamine has the lowest viscosity of the Dimer acid-based tetra-amides. Its ingredients also are the most readily available and therefore lowest in cost.

The fatty amide-containing material can also comprise a mono-amide. In fact, in the preferred case, the phase change ink carrier composition comprises both a tetra-amide compound and a mono-amide compound. The mono-amide compound typically comprises either a primary or secondary mono-amide, but is preferably a secondary mono-amide. Of the primary mono-amides, stearamide, such as Kemamide S, manufactured by Witco Chemical Company, can be employed herein. As for the secondary mono-amides, behenyl behenamide (Kemamide EX-666), and stearyl stearamide (Kemamide S-180 and Kemamide EX-672), all manufactured by Witco Chemical Company, are extremely useful mono-amides. However, stearyl stearamide is the mono-amide of choice in producing the phase change ink carrier composition of the present invention.

Another way of describing the preferred secondary mono-amide compound of this invention is by structural formula. More specifically, the secondary mono-amide compound is comprised as a composition which is represented by the structural formula:

$$C_xH_y—CO—NHC_aH_b$$

wherein:

x is an integer from 5 to 21
y is an integer from 11 to 43
a is an integer from 6 to 22
b is an integer from 13 to 45

The preferred fatty amide-containing compounds of this invention comprise a plurality of fatty amide materials which are physically compatible with each other. Typically, even when a plurality of fatty amide-containing compounds are employed to produce the phase change ink carrier composition, the carrier composition has a substantially single melting point transition. The melting point of the phase change ink carrier composition is preferably at least about 70° C., more preferably at least about 80° C., and most preferably at least about 85° C.

The preferred phase change ink carrier composition comprises a tetra-amide and a mono-amide. The weight ratio of the tetra-amide to the mono-amide in the preferred instance is from about 2:1 to 1:10, and more preferably, from about 1:1 to 1:3.

In order to add more flexibility and adhesion to the phase change ink carrier composition, a tackifier can be employed. The preferred tackifiers are those which are compatible with fatty amide-containing materials. These include, for example, Foral 85, a glycerol ester of hydrogenated abietic (rosin) acid, and Foral 105, a pentaerythritol ester of hydroabietic (rosin) acid, both manufactured by Hercules Chemical Company; Nevtac 100 and Nevtac 80, synthetic polyterpene resins manufactured by Neville Chemical Company; Wingtack 86, a modified synthetic polyterpene resin manufactured by Goodyear Chemical Company; and Arakawa KE 311, a rosin ester manufactured by Arakawa Chemical Company. However, Arakawa KE 311 is the tackifier of choice in producing the phase change ink carrier composition of the present invention.

Another compound which can be added in forming the subject phase change ink carrier composition is a plasticizer which is incorporated into the carrier composition to increase its flexibility and lower its melt viscosity. Plasticizers which have been found to be particularly advantageous in the composition of the subject invention preferably include dioctyl phthalate, diundecyl phthalate, alkylbenzyl phthalate (Santicizer 278) and triphenyl phosphate, all manufactured by Monsanto Chemical Company; tributoxyethyl phosphate (KP-140) manufactured by FMC Corporation; dicyclohexyl phthalate (Morflex 150) manufactured by Morflex Chemical Company Inc.; and trioctyl trimellitate, manufactured by Kodak. However, Santicizer 278 is the plasticizer of choice in producing the phase change ink carrier composition of the present invention.

Other materials may be added to the phase change ink carrier composition. In a typical phase change ink chemical composition, antioxidants are added for preventing discoloration of the carrier composition. The preferred antioxidant materials can include Irganox 1010 manufactured by Ciba Geigy; and Naugard 76, Naugard 512, and Naugard 524 manufactured by Uniroyal Chemical Company; the most preferred antioxidant being Naugard 524.

In a preferred case, the phase change ink carrier composition comprises a tetra-amide and a mono-amide compound, a tackifier, a plasticizer, and a viscosity modifying agent. The preferred compositional ranges of this phase change ink carrier composition are as follows: From about 10 to 50 weight percent of a tetraamide compound, from about 30 to 80 weight percent of a mono-amide compound, from about 0 to 25 weight percent of a tackifier, from about 0 to 25 weight percent of a plasticizer, and from about 0 to 10 weight percent of a viscosity modifying agent.

As previously indicated, the subject phase change ink formed from the phase change ink carrier composition exhibits excellent physical properties. For example, the subject phase change ink, unlike prior art phase change inks, exhibits a high level of lightness, chroma, and rectilinear light transmissivity when utilized in a thin film of substantially uniform thickness, so that color images can be conveyed using overhead projection techniques. Another excellent property of the ink carrier is that it is amenable to being reoriented into a thin film after printing without cracking or transferring to the rollers typically used for reorientation.

A phase change ink printed substrate is typically produced according to the methods of this invention in a drop-on-demand ink jet printer. The phase change ink is applied to at least one surface of the substrate in the form of a predetermined pattern of solidified drops. Upon impacting the substrate surface, the ink drops, which are essentially spherical in flight, wet the substrate, undergo a liquid-to-solid phase change, and adhere to the substrate. Each drop on the substrate surface is non-uniform in thickness and transmits light in a non-rectilinear path.

The pattern of solidified phase change ink drops can, however, be reoriented to produce a light-transmissive phase change ink film on the substrate which has a high degree of lightness and chroma, when measured with a transmission spectrophotometer, and which transmits light in a substantially rectilinear path. The reorientation step involves the controlled formation of a phase change ink layer of a substantially uniform thickness. After reorientation, the layer of light-transmissive ink will transmit light in a substantially rectilinear path. If the substrate on which the subject in is applied is also light transmissive, a projected image having clearly visible intense colors can be formed when a beam of light is projected through the reoriented printed substrate.

The transmission spectra for each of the phase change inks used in this invention were evaluated on a commercially available spectrophotometer, the ACS Spectro-Sensor II, in accordance with the measuring methods stipulated in ASTM E805 (Standard Practice of Instrumental Methods of Color or Color Difference Measurements of Materials) using the appropriate calibration standards supplied by the instrument manufacturer. For purposes of verifying and quantifying the overall colorimetric performance of this invention, measurement data were reduced, via tristimulus integration, following ASTM E308 (Standard Method for Computing the Colors of Objects using the CIE System) in order to calculate the 1976 CIE L* (Lightness), a* (redness-greeness), and b* (yellownessblueness), (CIELAB) values for each phase change ink sample. In addition, the values for CIELAB Psychometric Chroma, $C^*_{ab}$, and CIELAB Psychometric Hue Angle, $h_{ab}$ were calculated according to publication CIE 15.2, Colorimetry (Second Edition, Central Bureau de 1*a* CIE, Vienna, 1986).

Unlike conventional phase change ink carriers, the nature of the phase change ink carrier composition of the present invention is such that thin films of substantially uniform thickness exhibit a relatively high L* value. For example, a substantially uniform thin film of about 20 micron thickness of the phase change ink carrier composition of this invention preferably has an L* value of at least about 65, more preferably at least about 75, and most preferably at least about 85.

The phase change ink carrier composition forms an ink by combining the same with a colorant. Preferably, a subtractive primary colored phase change ink set will be formed by combining the ink carrier composition with compatible subtractive primary colorants. The subtractive primary colored phase change inks of this invention comprise four component dyes, namely, cyan, magenta, yellow and black. Preferably, the subtractive primary colorants employed comprise dyes from either class of Color Index (C.I.) Solvent Dyes and Disperse Dyes. Employment of some C.I. Basic Dyes has also been successful by generating, in essence, an in situ Solvent Dye by the addition of an equimolar amount of sodium stearate with the Basic Dye to the phase change ink carrier composition. Acid Dyes and Direct Dyes have also been found to be compatible to a certain extent.

The phase change inks formed therefrom have, in addition to a relatively high L* value, a relatively high $C^*_{ab}$ value when measured as a thin layer of substantially uniform thickness as applied to a substrate. A reoriented layer of the phase change ink composition of the present invention on a substrate has a $C^*_{ab}$ value, as a substantially uniform thin film of about 20 micron thickness, of subtractive primary yellow, magenta and cyan phase change ink compositions, which preferably are at least about 40 for said yellow ink composition, at least about 65 for said magenta ink composition, and at least about 30 for said cyan ink composition.

Conventional phase change inks used for printing onto substrates have a very low degree of rectilinear light transmissivity, even as layers of substantially uniform thickness, as compared to the layers of phase change inks applied to substrates according to the methods of this invention. Furthermore, reorienting the subject phase change ink printed substrates substantially increases the light transmissivity properties of the ink layer as compared those of a counterpart printed substrate which is not of a uniform thickness and has not been reoriented. More specifically, the increase in the $C^*_{ab}$ value of the respective subtractive primary yellow, magenta and cyan colors of the reoriented ink layers of this invention, as compared to the $C^*_{ab}$ value of the subtractive primary yellow color of said original ink layer which is not of a uniform thickness and has not been reoriented, is at least about 20 for the yellow color, is at least about 35 for the magenta color, and is at least about 15 for the cyan color. It is also important that the black color phase change ink component be at a minimum light transmissivity level so that it's optical density is maximized. Accordingly, the L* value of a substantially uniform thin film of about 20 micron thickness of a black color phase change ink is preferably not more than about 35, more preferably not more than about 30, and most preferably not more than about 25.

Figure 3:
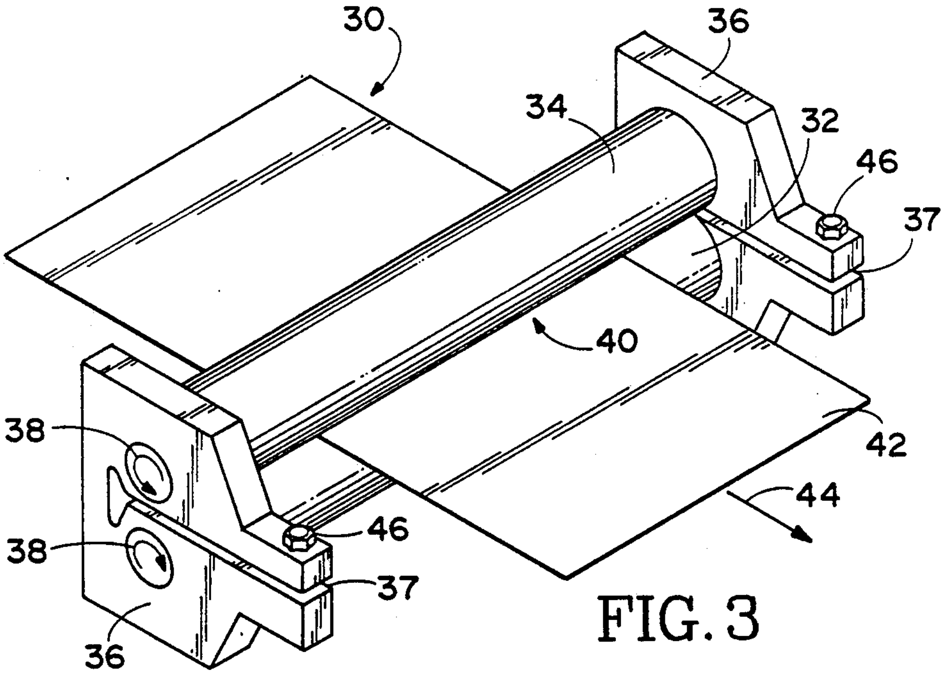
FIG. 3 is a perspective representation of a pressure reorientation system.

The solidified ink drops can be formed into a layer of substantially uniform thickness by the application thereto of pressure, or by a combination of heat and pressure, or by heat only. In the case of the use of pressure only, using for instance, the pressure reorientation system depicted in FIG. 3, the image as originally formed can be reoriented by passing same through a pair of opposed, unheated rollers under controlled conditions of pressure. In this way, a substrate will be produced in which the subject phase change ink layer comprises a layer of substantially uniform thickness.

If one of the above-described rollers is heated, a combined heat-pressure reorientation can also be effected which also produces an ink layer of substantially uniform thickness on the substrate. In the heat-pressure case, the pressure required to produce a uniform thickness is less than for pressure only.

Finally, a heat only system can be provided by passing the substrate over a heated platen after printing or exposing the printed substrate to a source of radiant heat after printing. The heat reorientation systems also can be used in conjunction with a subsequent pressure orientation step.

The substrate of the present invention on which the ink is printed is impermeable, such as a thin transparent film. The non-permeable substrate can be a sheet made from any flexible, transparent film material. The most typical of these film materials that might be used for a non-permeable substrate are sheets of cellulose acetate, cellulose triacetate, or polyester (polyethylene terephthlate). Other nonpermeable substrates which can be employed in this invention are sheets of polycarbonate and polystyrene, respectively. For example, polyester (polyethylene terephthlate) film is available from Dupont of Wilmington, Del., and is sold under the trademark Mylar® or ICI Americas sold under the trademark Melinex.

On a non-permeable substrate, such as a polymeric film or the like, the drops become deformed during reorientation such that the surface of the ink becomes substantially parallel to the surface of the substrate. This is important for overhead projection of images using light transmissive substrates such as thin films. When the outer surface of the ink is parallel to that of the substrate, light beams pass through the ink in a rectilinear manner without being refracted. The durability of the printed substrate is also increased partly due to an increase in contact area between the ink and the substrate.

The ink image layer is more fixedly bonded to the impermeable substrate by introducing a tough, flexible adhesion promoter layer between the ink image layer and the substrate. In this way, undesirable debonding of the ink image layer from the base substrate can be substantially prevented. The material used as the adhesion promoter layer should exhibit two requisite properties. First, the adhesion promoter layer should impart a high degree of affinity for bonding the ink image layer to the impermeable substrate. Secondly, the adhesion promoter must also be compatible with the ink image layer and optically clear to the extent that rectilinear light transmissivity through the printed substrate is substantially maintained. Preferably, a thermoplastic material, and more preferably a polyamide material, which is compatible with the fatty amidecontaining material is employed in forming the adhesion promoter layer. More particularly, a thermoplastic polyamide can be employed for use herein as an adhesion promoter. One such material which can be formed into an adhesion promoter layer is Versamid !655, a thermoplastic polyamide resin based on dimerized vegetable acid and aliphatic diamines, which is manufactured by Henkel Corporation of Minneapolis, Minn.

EXAMPLE 1

This example demonstrates that a rectilinearly light transmissive phase change ink-printed substrate can be produced comprising a base substrate, an intermediate adhesion promoter layer, and an outer phase change ink image layer.

The improved phase change ink-printed substrate was produced as follows: Solid phase change ink ingots of the subtractive colors were made in successive batches using 56 grams of Kemamide S-180, 30 grams of Unirez X37-523-235 (a Dimer acid-based tetra-amide material manufactured by Union Camp and formed by the reaction of one mole of dimer acid, two moles of ethylene diamine, and two moles of stearic acid), 10 grams of Arakawa KE 311 (Arakawa Chemical), 4 grams of Santicizer 278 (Monsanto), and various amounts of colorant. The ingredients for each batch were added to a 500 ml. beaker and heated with stirring to a temperature of about 150° C. After a homogeneous solution of the above materials was made, each of the molten inks was filtered through a heated funnel containing a fine porous stainless steel mesh screen. Each filtrate was poured into molds and allowed to solidify. Solid ink ingots of the colorant were formed.

The colorants used to make ingots of the four primary subtractive colors, magenta, cyan, black and yellow, are as follows: 2 grams of Neptun Red Base NP 543 (BASF, C.I. Solvent Red 49) to produce magenta solid ink ingots; 2.4 grams of Savinyl Blue GLF (Sandoz, C.I. Solvent Blue 44) to produce cyan ingots; 3.0 grams of Lampronol Black BR (ICI, C.I. Solvent Black 35) to produce black solid ingots; and 1.0 grams of Orasol Yellow 4GN (Ciba Geigy, C.I. Solvent Yellow 146) to produce yellow solid ingots.

A sample of each of the yellow, magenta, cyan and black phase change ingots described above were added to ink reservoirs of a modified drop-on-demand phase change ink jet printer, and the temperature was raised to 150° C. The printer was driven by a piezoelectric ceramic disc operating at about 10,000 pulse/second.

A raw 4 mil sheet of impermeable polyester (polyethylene terephthlate) film (Mylar, a trademarked product of Dupont) base substrate, was coated with an adhesive promoter to form a thin layer on the film surface. The adhesive promoter layer was applied using a 1% by weight solution of Versamid 1655, dissolved in a 2:1:1 weight ratio of n-butanol:i-propanol:toluene. The coating operation was conducted using a #30 Meyer rod. The adhesive promoter was allowed to air dry to a thin layer on the surface of the impermeable film prior to printing of the phase change ink.

The yellow, magenta, cyan and black phase change inks described above were printed onto the coated impermeable film base substrates at an addressability of about 300 drops per inch. The printed substrates had a ink image layer of non-uniform thickness which was subjected to a reorientation step using the pressure reorientation system depicted in FIG. 3, and also in Example 1 of copending application U.S. Pat. No. 4,889,761. Excellent adhesion existed between the printed image and the impermeable film due to the introduction of the intermediate layer of the polyamide adhesion promoter.

Having illustrated and described the principles of the invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A light-transmissive phase change ink printed substrate, which comprises a base substrate;

an adhesion promoter applied to at least one surface of said substrate, said adhesion promoter being applied as an optically clear uniform layer; and a layer of solidified light-transmissive phase change ink arranged in a predetermined pattern and having a substantially uniform thickness, which transmits light in a rectilinear path and is compatible with said adhesion promoter, printed onto at least one surface of said substrate and adheringly bonded thereto by said adhesion promoter layer.

2. The printed substrate of claim 1 wherein said base substrate is impermeable and light transmissive.

3. The printed substrate of claim 1, wherein said phase change ink composition comprises a fatty amide-containing material in combination with a compatible colorant.

4. The printed substrate of claim 1, wherein said fatty amide-containing material comprises a tetraamide compound and a mono-amide compound.

5. The printed substrate of claim 1, wherein said phase change ink composition comprises a subtractive primary colored phase change ink composition.

6. The printed substrate of claim 2 wherein said substrate is selected from cellulose acetate, cellulose triacetate, polystyrene, and polyester (polyethylene terephthlate).

7. The printed substrate of claim 1, wherein said adhesion promoter comprises a thermoplastic material compatible with said phase change ink.

8. The printed substrate of claim 1, wherein said adhesion promoter comprises a polyamide material.

* * * * *